Jan. 17, 1939.   E. DE W. COLEMAN   2,144,105
TEMPERATURE CONTROL DEVICE
Original Filed Aug. 6, 1934
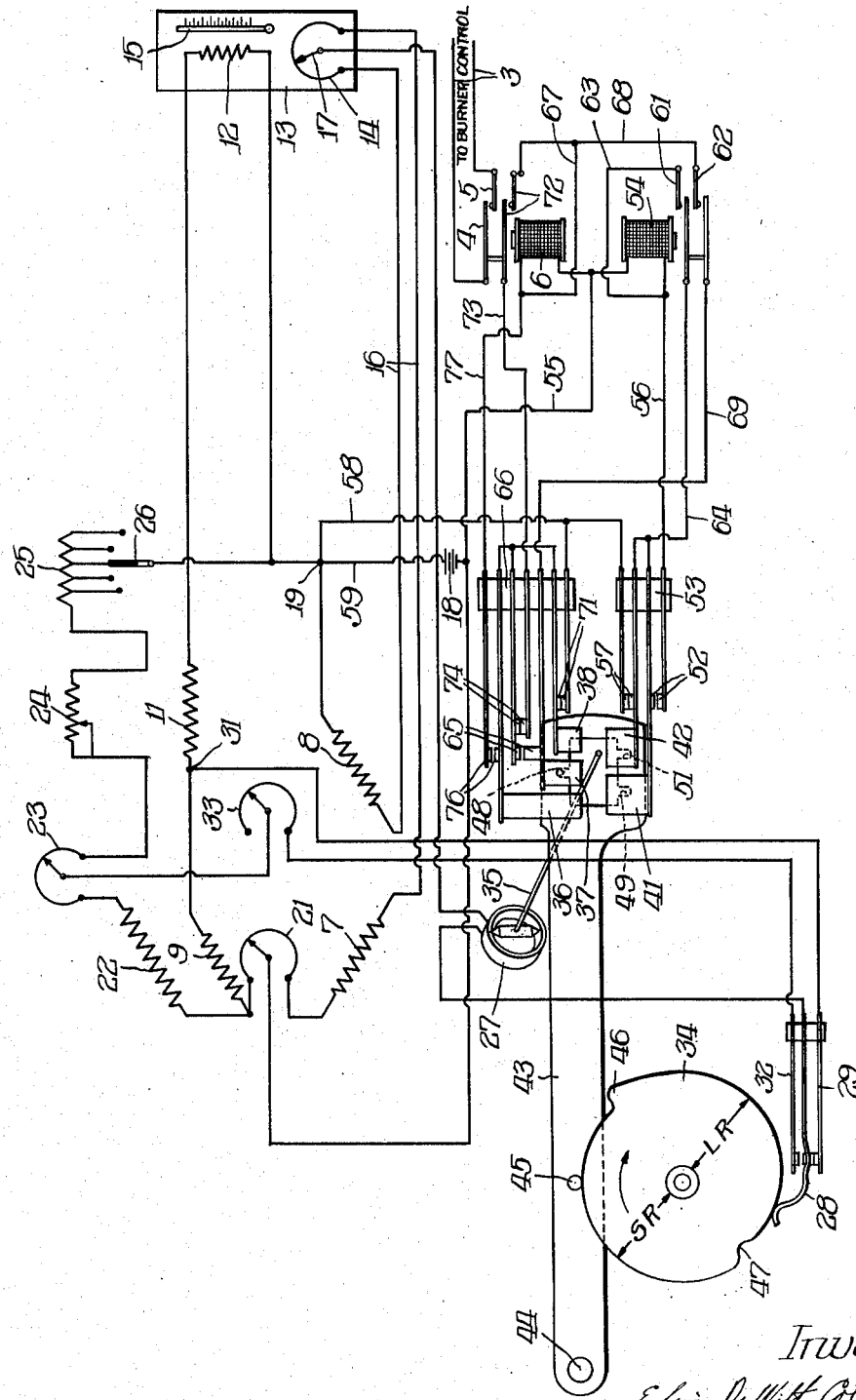
Inventor:
Edwin DeWitt Coleman Patented Jan. 17, 1939

2,144,105

UNITED STATES PATENT OFFICE 2,144,105

TEMPERATURE CONTROL DEVICE

Edwin De Witt Coleman, Maywood, Ill., assignor, by mesne assignments, to Micro Switch Corporation, Freeport, Ill., a corporation of Illinois Application August 6, 1934, Serial No. 738,613
Renewed April 27, 1936

33 Claims. (Cl. 236—91)

My invention relates to a temperature control apparatus.

In the operation of a heating apparatus there are two primary objectives, one of which is to maintain the temperature at a desired value or within a selected range and the other, is to operate the heating apparatus at its maximum efficiency. The accomplishment of these results involves a large number of factors which must be correlated and coordinated in such a manner that the ultimate control is a function of the various factors.

An object of the present invention is to provide a new and improved control apparatus for a heating system.

A further object is to provide a control apparatus in which the control is based on the indoor and outdoor temperature conditions.

Another object is to provide a control apparatus which is adjustable in accordance with the heat loss of the space being heated for various temperature conditions.

A further object is to provide a control apparatus for limiting the maximum and minimum temperatures of the heating apparatus in accordance with temperature conditions.

A still further object is to provide a control apparatus which may be readily and conveniently installed.

Other objects and advantages will appear as the description proceeds.

A complete understanding of the invention may be had by reference to the following description taken in conjunction with the accompanying drawing in which the single figure is a schematic diagram of an apparatus embodying the invention.

Referring now more in detail to the drawing a pair of conductors 3 are shown, the circuit thru which may be opened or closed through the upper contacts 4 and 5 of a relay 6. The mechanism for increasing or decreasing the amount of heat supplied is well known and requires no further description than to state that when the contacts 4 and 5 are closed heat will be supplied and when these contacts are open the heat will be shut off.

The devices for determining and coordinating the control conditions are embodied in two bridge circuits having two resistances, 7 and 8, in complementary arms which are common to both bridge circuits. The bridge circuit which is responsive to room temperature includes a resistance 9 in one arm and resistances 11 and 12 in another arm. Resistances 7, 8, 9, and 11 are preferably of a material having a low coefficient of temperature resistance such as manganin while the resistance 12 which is the room temperature responsive element is made of a material having a relatively high coefficient of temperature resistance such as nickel. The element 12 is mounted on a base or support 13 located in one of the rooms to be controlled and may be remote from the remainder of the control apparatus. The base 13 also preferably has a spirit thermometer 15 mounted thereon.

In order to adjust the temperature at which it is desired to maintain the room a potentiometer 14 is provided which may be mounted on base 13. This potentiometer is connected by leads 16 to resistances 7 and 8 and by shifting the contact arm, resistance may be added to or subtracted from either arm 7 or 8. With this arrangement the contact resistance of arm 17, which may be slightly variable, does not enter the bridge circuit and hence cannot affect the bridge balance. The potentiometer is preferably calibrated in degrees of temperature for convenience of adjustment.

A suitable source of electrical energy illustrated in this instance as a battery 18 is connected to one input point 19 and also to a potentiometer 21 at the opposite input point. The purpose of this potentiometer will be described hereinafter.

The other bridge circuit including the common resistances 7 and 8 has a fixed resistance 22 in one arm thereof, a potentiometer 23 at one of the output points, and variable resistances 24 and 25 serially connected in another arm. Resistance 22 is made of a material having a low coefficient of temperature resistance. The resistance 24 is adapted to be placed outdoors in a location responsive to outdoor temperature and may be placed in a suitable heat conducting cartridge for protection. This resistance is made of a material having a high coefficient of temperature resistance such as nickel. Resistance 25 is adapted to be responsive to the temperature of the heating apparatus, so as to provide a measure of the rate of heat input to the room. If for instance the heating apparatus is a steam or hot water system, this resistance may be wrapped about one of the steam or hot water outlet pipes from the boiler. This resistance is also made of a material having a high temperature coefficient of resistance. However, since this resistance is at a relatively high temperature compared to the surrounding atmosphere, temperature differences are apt to exist at the connections thereto with the lead wires and produce thermoelectric effects if the resistance is made of different material than the lead wires. It is therefore desirable to make this resistance of relatively fine copper wire, since copper is usually used in the lead wire. Resistance 25 is provided with taps and contact arm 26 so that the ratio of 24 to 25 may be readily altered thus selecting the degree of thermal change at 24 necessary to balance the bridge for a selected thermal change in resistance of 25.

Since resistances 24 and 25 are connected in series it will be evident that the degree of balance of the bridge will depend upon the sum of these resistances. Thus when it is cold outdoors the resistance value of resistance 24 will decrease and therefore resistance 25 must be hotter and increase its resistance to restore the balance of the bridge, and, vice versa, when the temperature outdoors becomes milder, a lower temperature of resistance 25 will suffice for bridge balance.

The resistance 24 is also responsive to wind velocity. Since this resistance is in an arm of the bridge circuit thru which current is constantly flowing the resistance will have a higher than atmospheric temperature. On a windy day the tempertaure of the resistance will be relatively lower than on a day of similar temperature when there is less wind. Thus a higher heating system temperature will be maintained on a windy day to provide a greater rate of heat input to compensate for greater heat losses from the space being heated.

Because the bridge circuit just described and the room temperature response bridge circuit are both affected by an adjustment of the potentiometer 14 a predetermined relationship or proportionality in the temperature response or sensitivity must be maintained between these circuits. Therefore in order to maintain this relationship the fixed resistance 11 is inserted in series with the room temperature responsive resistance 12 so that this arm of this bridge circuit will correspond substantially with the resistances 24 and 25 in the corresponding arm of the other bridge circuit.

The contact arm 17 of potentiometer 14, which is the common output point of both of the bridge circuits, is connected through a galvanometer 27 to a movable contact arm 28 of a mechanically actuated key or switch. One of the stationary arms 29 of this switch is connected to the output point 31 of the room temperature bridge and the other stationary arm 32 is connected through a variable resistance 33 to the contact arm of potentiometer 23 which is one of the output points of the upper bridge circuit. Thus when the movable arm 28 makes contact with arm 29 the galvanometer is in the room temperature bridge circuit and when the movable arm is in contact with arm 32 the galvanometer is in circuit with the upper bridge circuit.

Arm 28 is actuated by a cam 34 driven by any suitable source of power (not shown) at a slow rate as for instance one revolution in five minutes. One half of this cam has a long radius indicated as LR on the drawing and the other half of the cam has a short radius indicated by SR on the drawing. During one half of a revolution of the cam arm 28 will therefore contact with arm 29 and during the other half of the revolution this arm will contact with arm 32, so that the galvanometer will alternately be in each of the two circuits one half of the time.

The galvanometer is provided with a pointer 35 which extends between sets of segments comprising upper segments 36, 37, and 38 and lower segments 41 and 42. The pointer, of course, moves laterally in accordance with the amount of current flowing through the galvanometer and an upward and downward movement is imparted to the pointer by means of an arm 43 pivotally supported at 44. A pin 45 on the arm engages the cam 34 and the cam is provided with an outward projection 46 and a diametrically opposite inward depression 47. The outward end of arm 43 has an enlarged portion provided with a rectangular opening through which pointer 35 projects. This opening is of such a size that when the pin 45 rides on either the long or short radius of the cam the pointer may swing laterally clear of the segments. However when the pin rides over projection 46 the arm will move the pointer upwardly to actuate one of the upper segments, the segment actuated depending upon the position of the pointer, and when the pin 45 rides into the depression 47 the arm will move the pointer downwardly to actuate one of the lower segments. The rectangular opening is provided with an upper slot 48 and a pair of lower slots 49 and 51. The upper slot prevents the pointer from being moved downwardly when it lies between the segments 41 and 42, and the lower slots prevent the pointer from being moved upwardly when it lies between segments 36 and 37 or between segments 37 and 38. The slots may be made as wide as desired to confine the actuation of the pointer within the desired limits.

Assuming now that cam 34 is rotating in a clockwise direction, it will be noted that arm 28 is riding on the long radius of the cam so that the room temperature responsive bridge is in circuit with the galvanometer 27. If the room temperature is too low the galvanometer pointer will swing to the left over segment 41 and when depression 47 reaches pin 45 arm 43 will move downwardly and cause the pointer to depress segment 41. This operation will cause the normally open contacts 52 of a switch 53 to close and establish a circuit through the coil of relay 54 which may be traced from battery 18 to conductor 55, coil of relay 54, conductor 56, contacts 52, normally closed contacts 57 of switch 53, conductor 58, conductor 59 to the other side of the battery. The operation of relay 54 closes contacts 61 and 62 of the relay and the closing of contact 61 establishes a holding circuit over conductor 63 and conductor 64 and then following the circuit previously traced. Since the holding circuit includes the normally closed contacts 57 it will be evident that when the temperature of the room is too high and the galvanometer pointer swings to the right, a downward movement of arm 43 will cause the pointer to depress segment 42 to deenergize relay 54 and open contacts 61 and 62. If this relay is already deenergized when segment 42 is depressed it will remain deenergized. If the room temperature corresponds to that for which potentiometer 14 has been set the pointer will be in midposition and upon a downward movement of arm 43 the pointer will enter slot 48 and will not be depressed.

After depression 47 of the cam 34 has passed by pin 45 the arm 28 will reach the short radius of the cam 34 and so will open the contacts between arms 28 and 29 and close the contacts between arms 28 and 32 to place the galvanometer 27 in circuit with the upper bridge circuit which includes the outdoor temperature responsive resistance 24 and the boiler temperature responsive resistance 25.

The resistances 24 and 25 are so proportioned that for the minimum outdoor temperature acting on resistance 24, the resistance 25 will not permit the heating apparatus to become overheated. In mild weather the maximum heating system temperature is considerably lower than in cold weather due to the serial connection of these resistances, and overheating of the room prevented. If for instance with the ordinary heating system the heat is turned on in the morning when the room is cold and is left on until the room reaches the desired temperature before being shut off, the heat stored in the heating system will continue to raise the room temperature to too high a degree. With the present invention the heat stored in the heating system is limited by the outdoor temperature. The control system also maintains a minimum temperature of the heating system which varies with outdoor temperature conditions so that in mild weather a lower minimum is maintained than in cold weather.

If the temperature of the heating system is approximately correct for a given outdoor temperature, the galvanometer pointer will be in midposition when arm 28 is on the short radius of cam 34. A further rotation of cam 34 will cause projection 46 to engage pin 45 of arm 43 to raise the arm and engage the galvanometer pointer with segment 37. The raising of segment 37 may or may not cause relay 6 to operate depending upon whether relay 54 is in its operated position. If during the previous half cycle of cam 34 when the room temperature was being determined, the relay 54 was energized, indicating a low room temperature, the relay 6 now will be operated by the raising of segment 37. The initial raising of segment 37 first causes normally open contacts 65 of a switch 66 to be closed, establishing a circuit from battery 18 to conductor 55, coil of relay 6, conductor 67, conductor 68, contact 62 of relay 54, conductor 69, contacts 65 of switch 66, normally closed contacts 71 of switch 66, conductor 58, and conductor 59 to the other side of the battery. The operation of relay 6 prepares a holding circuit from battery 18 to conductor 55, coil of relay 6, conductor 67, contacts 72 of relay 6, conductor 73 normally closed contacts 74 of switch 66, normally closed contacts 71 of switch 66 and conductor 58 to the other side of the battery. Further raising of segment 37 causes normally closed contacts 74 of switch 66 to open, but if relay 54 is in the closed or operated position, this opening of contacts 74 will not deenergize relay 6, because as long as contacts 74 are open, contacts 65 will be closed and relay 6 will be energized through the operating circuit described above.

If the temperature during the previous half cycle of the cam was too high the pointer of the galvanometer would have swung to the right causing segment 42 to be depressed to either deenergize relay 54 or to allow it to remain deenergized if it was already so, in which event the raising of segment 37 on this half of the cycle will deenergize relay 6 and open the burner control circuit. It will be evident from this that as long as the room temperature is correct and the galvanometer pointer remains in such position that it will enter slot 48 on the downward movement of arm 43 and not be depressed the repeated actuation of segment 37 will have no effect. The operations of lower segments 41 and 42 are therefore chiefly concerned with the normal maintenance of the room temperature. It is further evident that segments 41 and 42 are actuated in response to the temperature at the area being controlled but that the functioning of either of these segments serves only to open or close relay 54, so that the effect of room temperature is reflected as burner control only in event segment 37 is selected on the subsequent upward movement of 43.

In addition, however, it is desirable to limit the maximum and minimum temperatures of the heating apparatus within limits which vary with weather conditions as pointed out above. If the temperature of the heating apparatus is too high for a given outdoor temperature the galvanometer pointer will swing to the right during the second half of the cam cycle, the elevation of segment 38 will open contacts 71 and deenergize relay 6. On the other hand if the temperature of the heating apparatus is too low for a given outdoor temperature, the galvanometer pointer will swing to the left and the elevation of segment 36 will close contacts 76 to energize relay 6 through a circuit from battery 18 to conductor 55, coil of relay 6, conductor 77, contacts 76 and contacts 71 of switch 66, conductor 58, and conductor 59 to the other side of the battery. The operation of relay 6 then again establishes a holding circuit previously described and remains operated until deenergized as required in the further operation of the control system.

Thus as long as the temperature of the heating system (as measured relative to the outside temperature), and therefore the rate of heat input to the space to be heated, remains within the range of values thereof represented by the breadth of the operating segment 37, the relay 6 operates to control the rate of heating in accordance with the room temperature as determined by the operation of segments 40 and 42. But when the heating system temperature, as measured relative to the outside temperature, goes outside the range of values thereof represented by the breadth of segment 37, segment 36 or 38 controls the heating system independently of the room temperature, and thereby imposses a limit upon the variation of the rate of heating.

In practice the heat requirements of the room are fixed not only by outside temperature but also by wind, solar radiations, etc. so that it becomes necessary to allow a sufficient range between the upper and lower temperature limits of the heating system to effectively meet these different conditions. In order to vary this range a greater or lesser amount of resistance is inserted in the output of the upper bridge circuit by means of the adjustable resistance 33. This adjustment affects only the sensitivity of the bridge circuit containing resistances 24 and 25 and does not affect the bridge balance or the sensitivity of the bridge circuit containing resistances 11 and 12.

Since in different installations the length of the leads to the room temperature responsive resistance, the outdoor temperature responsive resistance, and the remainder of the bridge circuits will vary it is necessary to compensate for the variation in the resistance of these leads. In order to adjust the apparatus after installation the calibrated potentiometer 14 is set at the temperature indicated by the room thermometer 15. Cam 34 is then moved until arm 28 is on the long radius to place the galvanometer in circuit with the room temperature responsive bridge and potentiometer 21 is adjusted until the galvanometer pointer is in midposition. This will compensate for the resistance of the controlled area leads and this bridge will be balanced. The cam is then rotated until arm 28 is on the short radius, placing the galvanometer in circuit with the bridge containing the outdoor and heating system responsive resistances. The potentiometer 23 is then adjusted until the galvanometer pointer is again in midposition. The adjustment of potentiometer 23 will not disturb the balance of the other bridge and the entire system will then be in balance. The potentiometer 14 may then be set at any desired temperature and the system is then ready for operation.

It will be understood that the nature and embodiment of the invention herein illustrated and described is merely a convenient and useful form of the invention and that many changes and modifications may be made therein without departing from the spirit and scope of the invention. Thus for instance the system could be applied to other types of heat interchange systems such as refrigerating systems in which case the room temperature responsive resistance 12 would be placed in the space to be refrigerated, the resistance 25 on the cooling coils, and the resistance 24 outside of the refrigerated space. Wherever the term heating system or similar terms are used it is intended to include heat absorbing systems as well as heat supplying systems.

Whereever reference is made to the responding of a device to outside temperatures, it is to be understood that the responsive device need not be subjected directly to the outside atmosphere, but may be shielded as previously described, the intention being that the device is influenced to a considerable extent by the temperature existing outside of the enclosure in which the temperature is being regulated.

The practice of my present invention is not limited to bridge circuits operating on direct current and employing D'Arsonval galvanometers but includes both direct current and alternating current circuits and also includes various kinds of instruments such as, for example, dynamometers, electrometers, etc. Therefore whenever the term "galvanometer" appears in the claims it shall be construed to include all types of instruments responsive to the flow of electric current or to the presence of electric potential.

I claim:

1. A temperature control apparatus for a heating system comprising a pair of bridge circuits, one of said bridge circuits including means responsive to an enclosure temperature, the other bridge circuit including means responsive to the temperature of the heating system, a galvanometer, means for alternately connecting the galvanometer to one bridge circuit and then the other, and means for effecting a temperature control in accordance with the combined effects of said alternate connections of the galvanometer.

2. A temperature control apparatus for a heating system comprising a bridge circuit including an enclosure temperature responsive resistance, a second bridge circuit including a resistance responsive to the temperature of the heating system, a galvanometer, means for alternately connecting said galvanometer from one of said bridge circuits to the other, means for coordinating the effects of said bridge circuits on the galvanometer, and means operating in accordance with said coordinating means for effecting a temperature control.

3. The combination of the preceding claim, wherein said bridge circuits include resistors common to both bridge circuits.

4. A temperature control apparatus for a heating system, first means responsive to an enclosure temperature, second means responsive to the temperature of the heating system, a first relay, a second relay for effecting a temperature control, a galvanometer separately responsive to said first and second means, means for first rendering said galvanometer responsive to said first means and said first relay responsive to said galvanometer and for next rendering said galvanometer responsive to said second means and said second relay responsive to the combined operated conditions of both said first relay and said galvanometer.

5. A temperature control apparatus for a heating system comprising a galvanometer, means for alternately rendering said galvanometer responsive to an enclosure temperature and to the temperature of the heating system, a pointer actuated by said galvanometer, a pair of switches each having actuating segments along the line of movement of said pointer, means for selectively causing said pointer to actuate the segments of one switch when the galvanometer is responsive to an enclosure temperature, means for selectively causing said pointer to actuate the segments of the other switch when the galvanometer is responsive to the temperature of the heating system, and means operable in accordance with the operation of said switches for effecting a temperature control.

6. A temperature control apparatus for a heating system comprising a galvanometer, means for alternately rendering said galvanometer responsive to an enclosure temperature and to the temperature of the heating system, a pointer actuated by said galvanometer, a pair of switches each having actuating segments along the line of movement of said pointer, means for selectively causing said pointer to actuate the segments of one of the switches when the galvanometer is responsive to the enclosure temperature and of the other switch when the galvanometer is responsive to the temperature of the heating system, a relay selectively operable through one of said switches in accordance with the enclosure temperature, and a second relay for effecting a temperature control selectively operable through the said switches in accordance with the temperature of the heating system and the condition of the other relay.

7. In combination in a temperature control apparatus for a heating system, a galvanometer, means for alternately rendering said galvanometer responsive to an enclosure temperature and to the temperature of the heating system, a pointer actuated by said glavanometer, a pair of switches each having actuating segments along the line of movement of said pointer, means for selectively causing said pointer to actuate the segments of one of the switches when the galvanometer is responsive to the enclosure temperature and of the other switch when the galvanometer is responsive to the temperature of the heating system, a first relay selectively operable through one of said switches in accordance with the enclosure temperature and a second relay for effecting a temperature control selectively operable through said switches in accordance with the combined operated position of said pointer and operated condition of the first relay.

8. A temperature control apparatus for a heating system comprising a pair of bridge circuits having two arms in common, one of said circuits having in one arm a resistance responsive to enclosure temperature, the other of said circuits having in one arm a resistance responsive to the temperature of the heating system, a potentiometer for selecting the desired enclosure temperature connected between said common arms, said potentiometer having a movable contact arm comprising a common output point of said bridge circuits, and means operable in accordance with the combined effects of said bridge circuits for effecting a temperature control.

9. A temperature control apparatus for a heating system comprising a pair of bridge circuits having two arms in common, one of said circuits having therein a resistance responsive to the temperature of a first region, the other of said circuits having therein a resistance responsive to the temperature of a second region, said second region being in heat exchanging relation with said first region, means in the common arms of said bridges for selecting the desired temperature of said first region, whereby an adjustment thereof serves to adjust both bridge circuits, and means operable in accordance with the combined effects of both said bridge circuits for effecting a temperature control of said first region.

10. A temperature control apparatus for a heating system comprising a pair of bridge circuits having two arms in common, one of said circuits having therein a resistance responsive to an enclosure temperature, the other of said circuits having therein a resistance responsive to the temperature of the heating system, and having also a resistance responsive to outside temperature, means in the common arms for selecting the desired enclosure temperature, whereby an adjustment of said means serves to adjust both bridge circuits, and means operable in accordance with the combined effects of both said bridge circuits for effecting a temperature control.

11. A temperature control apparatus for a heating system comprising a pair of bridge circuits having two arms in common, one of said bridge circuits including a resistance responsive to enclosure temperature, the other bridge circuit including a resistance responsive to the temperature of the heating system, a potentiometer for selecting the desired enclosure temperature between the common arms, a movable contact arm of said potentiometer constituting a common output point of said bridge circuits, the other output points being individual to each bridge circuit, a galvanometer connected to said common output point, and means for alternately connecting the galvanometer to the individual output points to combine the effects of said bridge circuits.

12. A temperature control apparatus for a heating system comprising a pair of bridge circuits having two arms in common, one of said bridge circuits including a resistance responsive to an enclosure temperature, the other bridge circuit including a resistance responsive to the temperature of means in heat exchanging relation with said enclosure, output points individual to the separate bridge circuits, a galvanometer, and means for alternately connecting the galvanometer to the individual output points to combine the effects of both said bridge circuits.

13. A temperature control apparatus for a heating apparatus comprising a pair of bridge circuits having two impedance arms in common, one of said bridge circuits having an enclosure temperature responsive means therein, which may be remotely situated from the apparatus, the other of said bridge circuits having means responsive to the temperature of the heating system, said bridge circuits having common input points, a potentiometer at one of said input points for affecting the balance of both said circuits similarly and a movable contact arm of said potentiometer constituting one of said input points.

14. A temperature control apparatus for a heating system comprising means responsive to an enclosure temperature, means responsive to the temperature of the heating system, a galvanometer, a cam, a switch operated by said cam for alternately connecting the galvanometer to one of said means and then to the other, a pointer actuated by said galvanometer, a pair of switches each having operating segments for operating the switches, the segments of one switch being below the line of movement of said pointer and the segments of the other switch being above the line of movement of said pointer, means actuated by said cam for moving the pointer into engagement with the segments of one of said switches when the galvanometer is connected to one of said temperature responsive means and into engagement with the segments of the other switch when the galvanometer is connected with the other of said temperature responsive means, and means for effecting a temperature control actuated through said switches.

15. A temperature control apparatus for a heating system comprising a pair of bridge circuits having two arms in common, one of said circuits having an arm including a resistance responsive to the temperature of the heating system, one arm of the other bridge circuit including a resistance responsive to an enclosure temperature, a variable resistance in said common arms for setting the desired enclosure temperature, the total resistance of the arm including the enclosure temperature resistance and its sensitivity being so related to the total resistance of the arm including the heating system resistance and its sensitivity that an adjustment of said variable resistance will retain the temperature response effects of said bridge circuits within a predetermined relationship, and means associated with said bridge circuits for effecting a temperature control.

16. A temperature control apparatus for a heating system comprising a pair of bridge circuits having two arms in common, one of said bridge circuits having an arm including a resistance responsive to the temperature of the heating system, the other bridge having an arm including a resistance responsive to an enclosure temperature, a variable resistance between said common arms for setting the desired room temperature, the temperature resistance curve of the arm including the enclosure temperature responsive resistance being so related to the temperature resistance curve of the arm of the other bridge including the heating system responsive resistance that an adjustment of said variable resistance will retain a predetermined relationship between the temperature response effects of said bridge circuits, and means associated with said bridge circuits for effecting a temperature control.

17. A temperature control apparatus for a heating system comprising a pair of bridge circuits having two arms in common, one of said bridge circuits having an arm including a resistance responsive to the temperature of an enclosure, the other bridge having an arm including a resistance responsive to the temperature of means in heat exchanging relation with said enclosure, a variable resistance in said common arms for setting the desired enclosure temperature, the temperature resistance curve of the arm including the enclosure temperature responsive resistance being so related to the temperature resistance curve of the arm of the other bridge including the resistance responsive to the temperature of said means, that an adjustment of said variable resistance will retain a predetermined relationship between the temperature response effects of said bridge circuits, and means associated with said bridge circuits for effecting a temperature control.

18. A temperature control apparatus for a heating system comprising a bridge circuit having a plurality of impedance arms, one of said arms including serially a resistance responsive to the temperature of the heating system and a resistance responsive to the outdoor temperature whereby the circuit is rendered responsive to the sum of said two temperature responsive resistances, means including a galvanometer responsive to said bridge circuit for decreasing the amount of heat supplied when said sum reaches a predetermined maximum value and for increasing the amount of heat supplied when said sum reaches a predetermined minimum value, and means for controlling the sensitivity of the response of said galvanometer to unbalanced conditions of said bridge circuits, whereby to vary the temperature difference between said maximum and minimum values.

19. A temperature control apparatus for a heating system comprising a circuit including a resistance responsive to outdoor temperature and a resistance responsive to the temperature of the heating system, means responsive to an enclosure temperature and means comprising a pair of bridge circuits for coordinating the effects of said temperature responsive devices for effecting a temperature control.

20. A temperature control apparatus for a heating system comprising a pair of bridge circuits having two arms in common, one of said circuits having in one arm a resistance responsive to an enclosure temperature, the other of said circuits having in one arm a resistance responsive to outdoor temperature, a potentiometer for selecting the desired enclosure temperature connected between said common arms, said potentiometer having a movable contact arm comprising a common output point of said bridge circuits, and means operable in accordance with the combined effects of said bridge circuits for effecting a temperature control.

21. A temperature control apparatus for a heating system comprising a pair of bridge circuits having two arms in common, one of said circuits having in one arm a resistance responsive to an enclosure temperature, the other of said circuits including serially a resistance responsive to the temperature of the heating system and a resistance responsive to outdoor temperature, potentiometer means for selecting the desired enclosure temperature connected between said common arms and comprising a common output point of said bridge circuits, and means operable in accordance with the combined effects of said bridge circuits for effecting a temperature control.

22. A temperature control apparatus for a heating system comprising means responsive to an enclosure temperature, means responsive to the temperature of the heating system, a galvanometer, means for selectively connecting said galvanometer to the enclosure-temperature-responsive means and to the heating-system-temperature-responsive means, and means for operating the heating system in accordance with the combined effect of the enclosure temperature and heating system temperature.

23. A temperature control apparatus for a heating apparatus comprising a pair of bridge circuits having two impedance arms in common, one of said bridge circuits having an enclosure temperature responsive means therein which may be remotely situated from the apparatus, the other of said bridge circuits having means responsive to the outside temperature, said bridge circuits having common input points, a potentiometer at one of said input points for affecting the balance of both said circuits and a movable contact arm of said potentiometer constituting one of said input points.

24. A temperature control apparatus for a heating apparatus comprising a pair of bridge circuits having two impedance arms in common, one of said bridge circuits having an enclosure-temperature-responsive impedance therein which may be remotely situated from the apparatus, the other of said bridge circuits having both an impedance responsive to the temperature of the heating system and an impedance responsive to the outside temperature, said bridge circuits having common input points, a potentiometer at one of said input points for affecting the balance of both said circuits and a movable contact arm of said potentiometer constituting one of said input points.

25. A temperature control apparatus for a heating system comprising a bridge circuit having a plurality of impedance arms, one of said arms including serially a resistance responsive to the temperature of the heating system and a resistance responsive to outdoor temperature whereby the circuit is rendered responsive to the sum of said temperature responsive resistances, means for decreasing the amount of heat supplied when said sum reaches a predetermined maximum value, means for increasing the amount of heat supplied when said sum reaches a predetermined minimum value, and means for adjusting the ratio of said temperature responsive resistances.

26. A temperature control apparatus for a heating system comprising a bridge circuit including means responsive to outdoor temperature, means comprising a resistance element of copper wire responsive to the temperature of the heating system, said means being in series, means responsive to the temperature of an enclosure, and means for coordinating the effects of said temperature responsive devices for effecting a temperature control.

27. A temperature control apparatus for a heating system comprising a pair of bridge circuits each having a pair of independent arms, said bridge circuits having a pair of arms in common, one of said circuits having in its pair of independent arms a resistance responsive to enclosure temperature, the other of said circuits having in its pair of independent arms a resistance responsive to the temperature of the heating system, means in said common arms adapted to be manipulated manually for selection of a desired enclosure temperature, means in the arms making up the first bridge circuit adapted to be adjusted for calibrating said first bridge circuit for operation in accordance with the adjustments of said first means, means in the independent arms of the second bridge circuit for calibrating said second bridge circuit in accordance with the adjustments of said first means, whereby an adjustment of said third means does not disturb the calibration of said first bridge circuit effected by said second means, and fourth means operable in accordance with the combined effects of said bridge circuits for effecting the temperature control.

28. A temperature control apparatus for a heating system comprising a pair of bridge circuits each having a pair of independent arms, said bridge circuits having a pair of common arms, the first of said bridge circuits having in its pair of independent arms means responsive to an enclosure temperature, the second of said circuits having in its pair of independent arms means responsive to the temperature of the heating system, first adjusting means in said common arms effective for adjusting both of said bridge circuits simultaneously, second and third adjusting means effective for adjusting said bridge circuits, said second adjusting means being effective to adjust at least one of said bridge circuits, said third adjusting means being effective to adjust only the other of said bridge circuits, and means operable in accordance with the combined effects of said bridge circuits for effecting a temperature control.

29. The combination of the immediately preceding claim wherein said second adjusting means is included in said common arms of said bridge circuits.

30. In combination in a temperature control apparatus for a heating system, a first resistance bridge circuit for measuring the temperature of a space to be heated, a second resistance bridge circuit for measuring a relation between outside temperature and the rate of heat input to said space to be heated, a galvanometer alternately responsive to said two bridge circuits, first and second control means for regulating the rate of heat input to said space alternately responsive to said galvanometer in such a manner that said first and second control means respond through said galvanometer to said first and second resistance bridge circuits respectively, said second control means being so constructed and arranged that it exercises a limit control to maintain said relation within a predetermined median range of values thereof, said second control means being operable when said rate of heat input changes in either direction to such an extent that said relation between outside temperature and rate of heat input passes outside said predetermined median range of values, to prevent said first control means from further changing said rate of heat input in the same direction during the next alternate response of said first control means to said galvanometer, said first control means being so constructed and arranged that it is operable normally to regulate said rate of heat input to maintain a predetermined temperature of said space.

31. In combination in a temperature control apparatus for a heating system, a pair of resistance thermometer bridge circuits each having a pair of arms independent of the other bridge circuit, means operable in accordance with the combined effects of said bridge circuits for effecting a temperature control, and adjusting means for adjusting one of said bridge circuits independently of the other circuit, said adjusting means including a series resistor in the pair of independent arms of said one bridge circuit and including also an adjustable tap for said resistor, said tap constituting one of the output terminals of said one bridge circuit.

32. In combination in a temperature control apparatus for a heating system, a first impedance means responsive to a first temperature condition, a second impedance means responsive to a second temperature condition, measuring means comprising two bridge circuits for measuring the respective impedance values of said first and second impedance means, first control means responsive to said first bridge circuit for effecting a temperature control to tend to maintain said first temperature condition at a predetermined value thereof, second control means responsive to said second bridge circuit for effecting a temperature control to tend to maintain said second temperature condition within a predetermined range of values thereof and for exercising a limit control upon said first control means by disabling said first control means whenever the value of said second predetermined condition falls outside of said predetermined range of values thereof, and adjusting means operable for adjusting both said bridge circuits together for shifting simultaneously the predetermined value of said first temperature condition and said predetermined range of values of said second temperature condition.

33. In combination in a temperature control apparatus for a heating system, a pair of resistance thermometer bridge circuits, means responsive to the combined effects of said two bridge circuits for effecting a temperature control, and means for adjusting said bridge circuits together to simultaneously similarly alter the balanced conditions of both said bridge circuits, the rates of adjustment of said two bridge circuits by said means being so proportioned that an adjustment of said means will leave substantially unchanged the relative effectiveness of each separate bridge circuit with respect to the other in effecting said temperature control.

EDWIN DE WITT COLEMAN.